United States Patent
Wood, Jr.

(10) Patent No.: US 6,265,963 B1
(45) Date of Patent: *Jul. 24, 2001

(54) METHODS OF PROCESSING WIRELESS COMMUNICATION, METHODS OF PROCESSING RADIO FREQUENCY COMMUNICATION, AND RELATED SYSTEMS

(75) Inventor: Clifton W. Wood, Jr., Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,849

(22) Filed: Jun. 23, 2000

Related U.S. Application Data (63) Continuation of application No. 08/769,653, filed on Dec. 19, 1996, now Pat. No. 6,104,333.

(51) Int. Cl.[7] ..................................... H04Q 5/22

(52) U.S. Cl. ............... 340/10.4; 340/10.1; 340/10.2; 340/572.1; 340/572.4; 341/173

(58) Field of Search .................. 340/10.1, 10.4, 340/572.1, 572.4, 10.2; 341/173, 176

(56) References Cited

U.S. PATENT DOCUMENTS

| | | |
|---|---|---|
| 3,911,396 | 10/1975 | Kobayshi et al. . |
| 4,075,632 | 2/1978 | Baldwin et al. . |
| 4,492,961 | 1/1985 | Koller et al. . |
| 4,691,202 | 9/1987 | Denne et al. . |
| 4,857,893 | 8/1989 | Carroll . |
| 4,926,182 | 5/1990 | Ohta et al. . |
| 5,055,659 | 10/1991 | Hendrick et al. . |
| 5,121,407 | 6/1992 | Partyka et al. . |
| 5,134,085 | 7/1992 | Gilgen et al. . |
| 5,258,762 | 11/1993 | Cabon et al. . |
| 5,266,925 | 11/1993 | Vercellotti et al. . |
| 5,272,367 | 12/1993 | Dennison et al. . |
| 5,305,008 | 4/1994 | Turner et al. . |
| 5,365,551 | 11/1994 | Snodgrass et al. . |
| 5,390,360 | 2/1995 | Scop et al. . |
| 5,406,263 | 4/1995 | Tuttle . |
| 5,430,441 | 7/1995 | Bickley et al. . |

(List continued on next page.)

FOREIGN PATENT DOCUMENTS

| | | |
|---|---|---|
| 0 427 342 A1 | 5/1991 | (EP) . |
| 0 467 036 A2 | 1/1992 | (EP) . |
| 0 585 132 A1 | 3/1994 | (EP) . |
| 0 702 324 A2 | 3/1996 | (EP) . |
| 2 259 227 A | 3/1993 | (GB) . |
| WO 93/25918 | 12/1993 | (WO) . |

OTHER PUBLICATIONS

Waugh, R.W., "Designing Detectors for RF/ID Tags", presentation at RF Expo, San Diego, CA, Feb. 1, 1995.

*Primary Examiner*—Brian Zimmerman
*Assistant Examiner*—Yves Dalencourt
(74) *Attorney, Agent, or Firm*—Wells, St. John, Roberts, Gregory & Matkin, P.S.

(57) ABSTRACT

Methods of processing wireless communication include providing at least one interrogator configured for transmitting and receiving wireless communication data. A plurality of identification devices are provided and are configured for receiving wireless communication data transmitted by the interrogator. Responsive to receiving such communication data, the devices are capable of generating and transmitting a reply back to the interrogator. Preferably, transmitted replies are delayed for different determinable amounts of time which enables the interrogator to detect multiple replies. In a preferred implementation, the wireless communication is radio frequency communication. In another preferred implementation, each device is capable of calculating its own delay utilizing a random value generator. Related system circuitry is described.

27 Claims, 5 Drawing Sheets

U.S. PATENT DOCUMENTS

| | | |
|---|---|---|
| 5,432,027 | 7/1995 | Tuttle et al. . |
| 5,448,110 | 9/1995 | Tuttle et al. . |
| 5,489,546 | 2/1996 | Ahmad et al. . |
| 5,494,495 | 2/1996 | Tuttle . |
| 5,497,140 | 3/1996 | Tuttle . |
| 5,523,749 | 6/1996 | Cole et al. . |
| 5,537,105 | 7/1996 | Marsh et al. . |
| 5,539,775 | 7/1996 | Tuttle et al. . |
| 5,552,772 | 9/1996 | Janky et al. . |
| 5,568,512 | 10/1996 | Rotzoll . |
| 5,621,412 | 4/1997 | Sharpe et al. . |
| 5,646,607 | 7/1997 | Schurmann et al. . |
| 5,649,296 | 7/1997 | MacLellan et al. . |
| 5,662,718 | 9/1997 | Tuttle . |
| 5,751,570 | 5/1998 | Stobbe et al. . |
| 5,790,946 | 8/1998 | Rotzoll . |
| 5,842,118 | 11/1998 | Wood, Jr. . |

_Fig. 1_

_Fig. 2_

FIG. 5

METHODS OF PROCESSING WIRELESS COMMUNICATION, METHODS OF PROCESSING RADIO FREQUENCY COMMUNICATION, AND RELATED SYSTEMS

CROSS REFERENCE TO RELATED APPLICATION

This is a Continuation of U.S. patent application Ser. No. 08/769,653, filed Dec. 19, 1996, now U.S. Pat. No. 6,104,333 and titled "Methods of Processing Wireless Communications, Methods of Processing Radio Frequency Communication, and Related Systems".

TECHNICAL FIELD

This invention relates to radio frequency communication devices. More particularly, the invention relates to radio frequency identification devices for inventory control, object monitoring, or for determining the existence, location or movement of objects.

BACKGROUND OF THE INVENTION

As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. Furthermore, there is a need for tag devices suitably configured to mount to a variety of objects including goods, items, persons, or animals, or substantially any moving or stationary and animate or inanimate object. One way of tracking objects is with an electronic identification system.

One presently available electronic identification system utilizes a magnetic field modulation system to monitor tag devices. An interrogator creates a magnetic field that becomes detuned when the tag device is passed through the magnetic field. In some cases, the tag device may be provided with a unique identification code in order to distinguish between a number of different tags. Typically, the tag devices are entirely passive (have no power supply), which results in a small and portable package. However, this identification system is only capable of distinguishing a limited number of tag devices, over a relatively short range, limited by the size of a magnetic field used to supply power to the tags and to communicate with the tags.

Another electronic identification system utilizes an RF transponder device affixed to an object to be monitored, in which an interrogator transmits an interrogation signal to the device. The device receives the signal, then generates and transmits a responsive signal. The interrogation signal and the responsive signal are typically radio-frequency (RF) signals produced by an RF transmitter circuit. Since RF signals can be transmitted over greater distances than magnetic fields, RF-based transponder devices tend to be more suitable for applications requiring tracking of a tagged device that may not be in close proximity to an interrogator. For example, RF-based transponder devices tend to be more suitable for inventory control or tracking.

SUMMARY OF THE INVENTION

Methods of processing wireless communication include providing at least one interrogator configured for transmitting and receiving wireless communication data. A plurality of identification devices are provided and are configured for receiving wireless communication data transmitted by the interrogator. Responsive to receiving such communication data, the devices are capable of generating and transmitting a reply back to the interrogator. Preferably, transmitted replies are delayed for different determinable amounts of time which enables the interrogator to detect multiple replies. In a preferred implementation, the wireless communication is radio frequency communication. In another preferred implementation, each device is capable of calculating its own delay utilizing a random value generator. Related system circuitry is described.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

This invention concerns wireless communication, and specifically radio frequency (RF) data communication systems and Is particularly concerned with systems which include a plurality of radio frequency (RF) identification devices of the type described below. The invention can be implemented in connection with a RF data communication system which is described in U.S. Pat. No. 6,130,602, entitled "Radio Frequency Data Communications Device", issued Oct. 10, 2000, and naming James O'Toole, John R. Tuttle, Mark E. Tuttle, Tyler Lowrey, Kevin Devereaux, George Pax, Brian Higgins, Shu-Sun Yu, David Ovard, and Robert Rotzoll as inventors. The disclosure of U.S. Pat. No. 6,130,602 is expressly incorporated by reference herein. This invention can also be implemented in connection with a communication system which is described in U.S. Pat. No. 5,842,118, entitled "Communication System Including Diversity Antenna Queuing", issued Nov. 24, 1998, naming Cliff Wood as the inventor and bearing an attorney docket number M140-057. The disclosure of U.S. Pat. No. 5,842,118, entitled "Communication System Including Diversity Antenna Queuing" is expressly incorporated herein by reference.

The discussion immediately following is, to a certain extent, duplicative of certain portions of the disclosure incorporated immediately above. Such is provided to give the reader an appropriate understanding and appreciation for the environment in which the invention is utilized. For a more detailed treatment, the reader is referred to application Ser. No. 08/705,043.

Overview of Device

Figure 1:
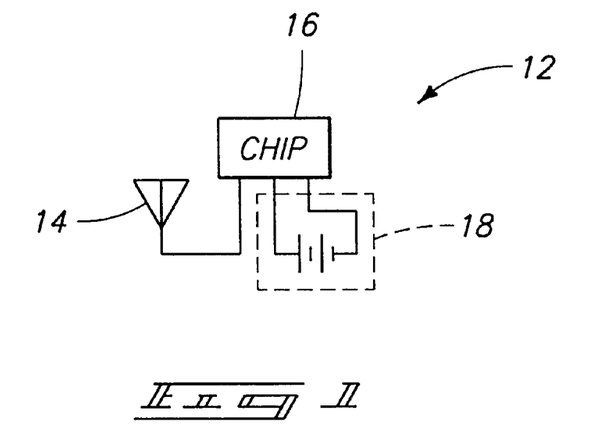
FIG. 1 is a high level circuit schematic showing a circuit embodying the invention.

FIG. 1 illustrates a radio frequency data communication device 12 at least a portion of which embodies the invention. The radio frequency data communication device 12 includes an integrated circuit 16, a power source 18 connected to the integrated circuit 16 to supply power to the integrated circuit 16, and at least one antenna 14 connected to the integrated circuit 16 for radio frequency transmission and reception by the integrated circuit 16. For purposes of this disclosure, including the appended claims, the term "integrated circuit" shall be defined as a combination of interconnected circuit elements inseparably associated on or within a continuous substrate. For purposes of this disclosure, including the appended claims, the term "semiconductive substrate" is defined to mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). For purposes of this disclosure, including the appended claims, the term "substrate" refers to any supporting structure, including, but not limited to, the semiconductive substrates described above. In the illustrated embodiment, the integrated circuit 16 is a monolithic integrated circuit. For purposes of this disclosure, including the appended claims, the term "monolithic integrated circuit" shall be defined as an integrated circuit wherein all circuit components are manufactured into or on top of a single chip of silicon. The integrated circuit 16 will be described in greater detail below. The power source 18 is a battery or other suitable power source.

Housing

The radio frequency data communication device 12 can be included in any appropriate housing or packaging.

Figure 2:
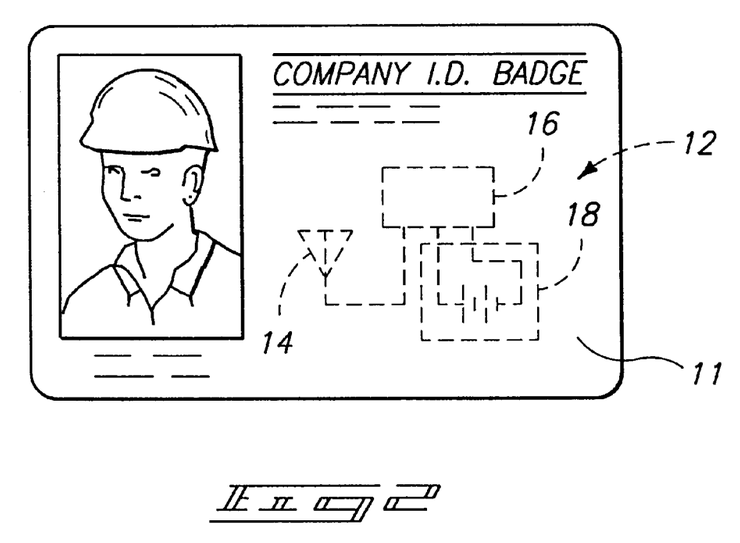
FIG. 2 is a front view of an employee badge according to but one embodiment the invention.

FIG. 2 shows but one example in the form of an employee identification badge 10 including the radio frequency data communication device 12, and a card 11 made of plastic or other suitable material. In one embodiment, the radio frequency data communication device 12 is laminated to the back face of the plastic card 11, and the card forms the visible portion of the badge. In another embodiment, the radio frequency data communication device 12 is bonded to the back face of the card by embedding it within a thin bond line of epoxy-based material. Alternatively, the radio frequency data communication device 12 is embedded into the plastic card 11. In one embodiment, the front face of the badge 10 has visual identification features including an employee photograph as well as identifying text.

Figure 3:
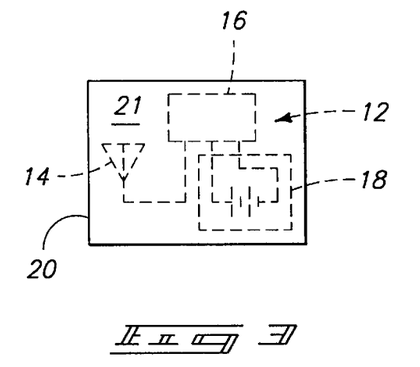
FIG. 3 is a front view of a radio frequency identification tag according to another embodiment of the invention.

FIG. 3 illustrates but one alternative housing supporting the device 12. More particularly, FIG. 3 shows a miniature housing 20 encasing the device 12 to define a tag which can be supported by an object (e.g., hung from an object, affixed to an object, etc.). The housing 20 preferably has the general shape and size, in plan view, of a postage stamp. The embodiment of FIG. 3 also includes a card 21 supporting the device 12 in the housing 20. The card 21 is formed of plastic or other suitable material having a thickness of about 0.040 inches, a width of about 1.25 inches, and a height of about 1.25 inches. In one embodiment, the device 12 is bonded to a back face of the card 21 with a thin layer of non-conductive epoxy material that cooperates with the card to define the housing 20.

Although two particular types of housings have been disclosed, the device 12 can be included in any appropriate housing. The device 12 is of a small size that lends itself to applications employing small housings, such as cards, miniature tags, etc. Larger housings can also be employed. The device 12, housed in any appropriate housing, can be supported from or attached to an object in any desired manner; for example using double sided tape, glue, lanyards, leash, nails, staples, rivets, or any other fastener. The housing can be sewn on to an object, hung from an object, implanted in an object (hidden), etc.

Antenna

Figure 5:
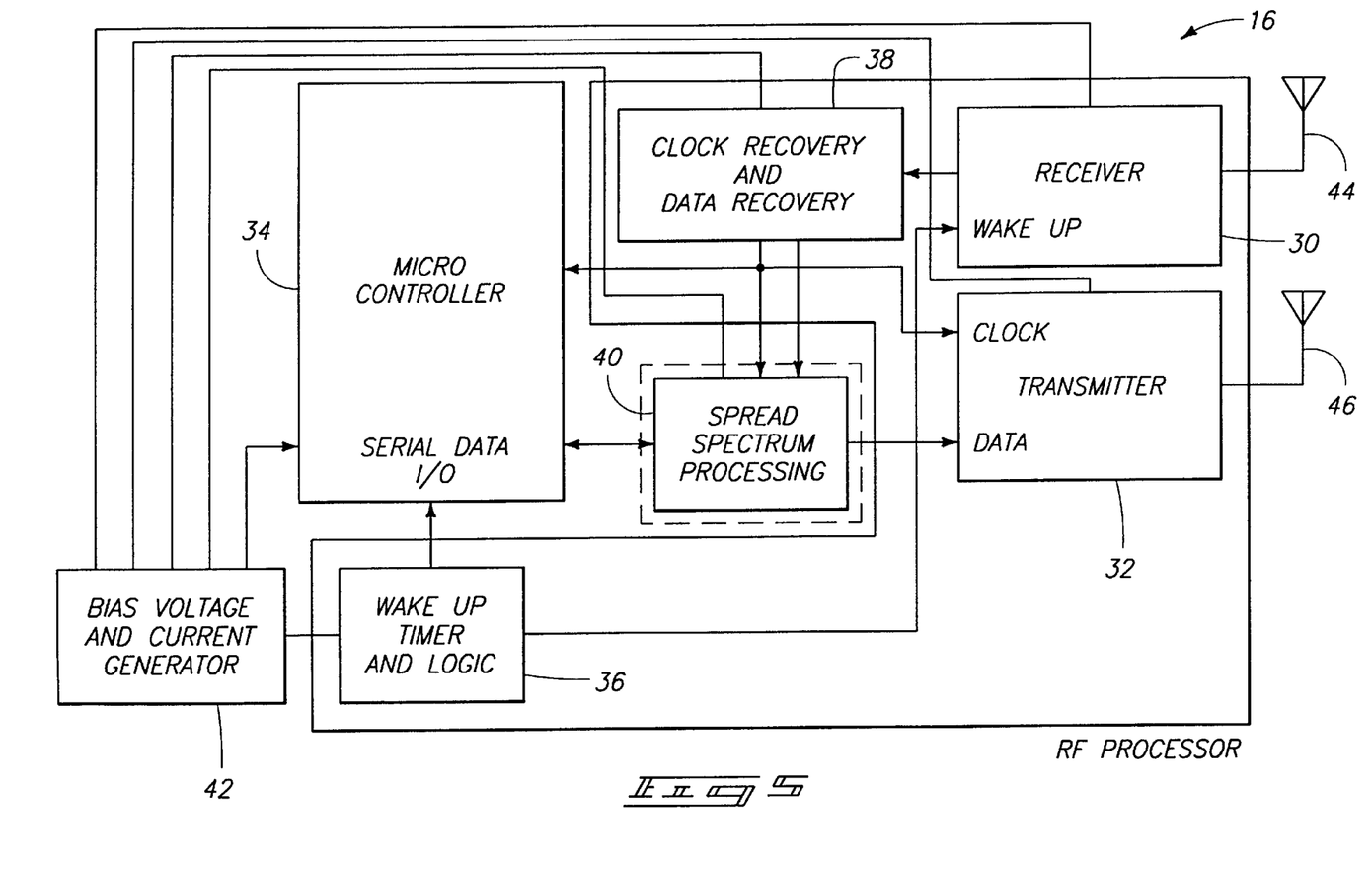
FIG. 5 is a high level circuit schematic of a monolithic semiconductor integrated circuit utilized in the devices of FIGS. 1–4.

Various configurations are possible for the antenna 14. The integrated circuit 16 includes a receiver 30 and a transmitter 32 (FIG. 5). In one embodiment, separate antennas 44 and 46 are provided for receiver and transmitter of the integrated circuit 16. In another embodiment (FIG. 1), a single antenna is shared by the receiver and transmitter sections. In one embodiment, the antenna is defined by conductive epoxy screened onto a card or housing. In the illustrated embodiment, the antenna is conductively bonded to the integrated circuit via bonding pads.

In an embodiment where a single antenna is employed, that single antenna preferably comprises a folded dipole antenna defining a continuous conductive path, or loop, of microstrip. Alternatively, the antenna can be constructed as a continuous loop antenna.

Battery

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. Exemplary button-type cells are disclosed in several pending U.S. patent applications including U.S. patent application Ser. No. 08/205,957, "Button-Type Battery Having Bendable Construction and Angled Button-Type Battery," listing Mark E. Tuttle and Peter M. Blonsky as inventors now U.S. Pat. No. 5,432,027; U.S. patent application Ser. No. 08/321,251, "Button-Type Batteries and Method of Forming Button-Type Batteries," listing Mark E. Tuttle as inventor U.S. Pat. No. 5,494,495; and U.S. patent application Ser. No. 08/348,543, "Method of Forming Button-Type Batteries and a Button-Type Battery Insulating and Sealing Gasket," listing Mark E. Tuttle as inventor now abandoned. These patent applications and resulting patents are hereby incorporated by reference. In an alternative embodiment, the battery 18 comprises a series connected pair of button type cells. Instead of using a battery, any suitable power source can be employed.

Overview of Communication System

Figure 4:
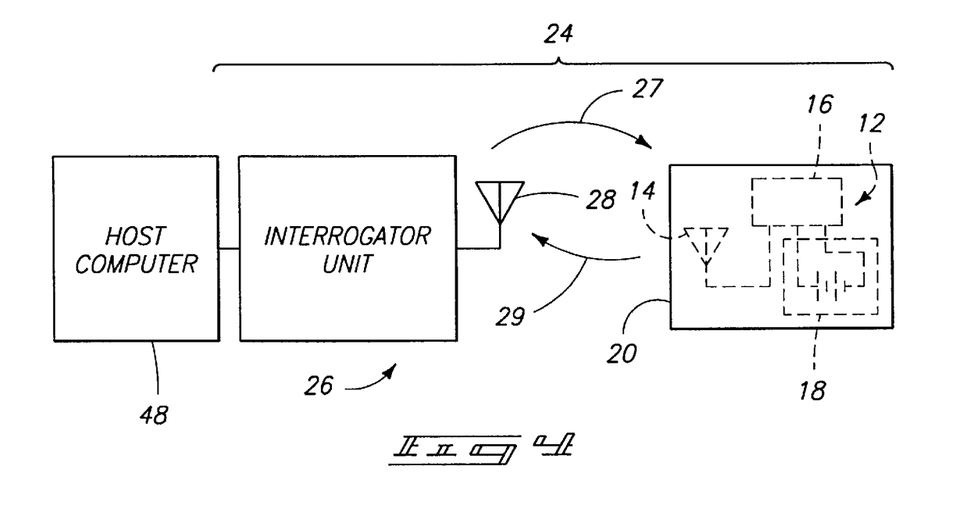
FIG. 4 is a block diagram of an electronic identification system according to the invention and including an interrogator and the tag of FIG. 3.

FIG. 4 illustrates a radio frequency communication system 24 including the device 12 and a radio frequency interrogator unit (hereinafter "interrogator") 26. The device 12 transmits and receives radio frequency communications to and from the interrogator 26. Preferably, the interrogator unit 26 includes an antenna 28, as well as dedicated transmitting and receiving circuitry, similar to that implemented on the integrated circuit 16. The system 24 further includes a host computer 48 in communication with the interrogator 26. The host computer 48 acts as a master in a master-slave relationship with the interrogator 26. The host computer 48 includes an applications program for controlling the interrogator 26 and interpreting responses, and a library ("MRL") of radio frequency identification device applications or functions. Most of the functions communicate with the interrogator 26. These functions effect radio frequency communication between the interrogator 26 and the device 12. These functions are described in a section titled "Protocol" appearing in U.S. patent application Ser. No. 08/705,043, entitled "Radio Frequency Data Communications Device" and incorporated by reference above.

One example of an interrogator implemented in combination with a transponder unit is disclosed in U.S. Pat. No. 4,857,893, hereby incorporated by reference. Generally, the interrogator 26 includes an antenna 28, and transmits an interrogation signal or command 27 ("forward link") via the antenna 28. The device 12 receives the incoming interrogation signal via its antenna 14. Upon receiving the signal 27, the device 12 responds by generating and transmitting a responsive signal or reply 29 ("return link"). Preferably, the responsive signal 29 is encoded with information that uniquely identifies, or labels the particular device 12 that is transmitting, so as to identify any object or person with which the device 12 is associated.

Figure 6:
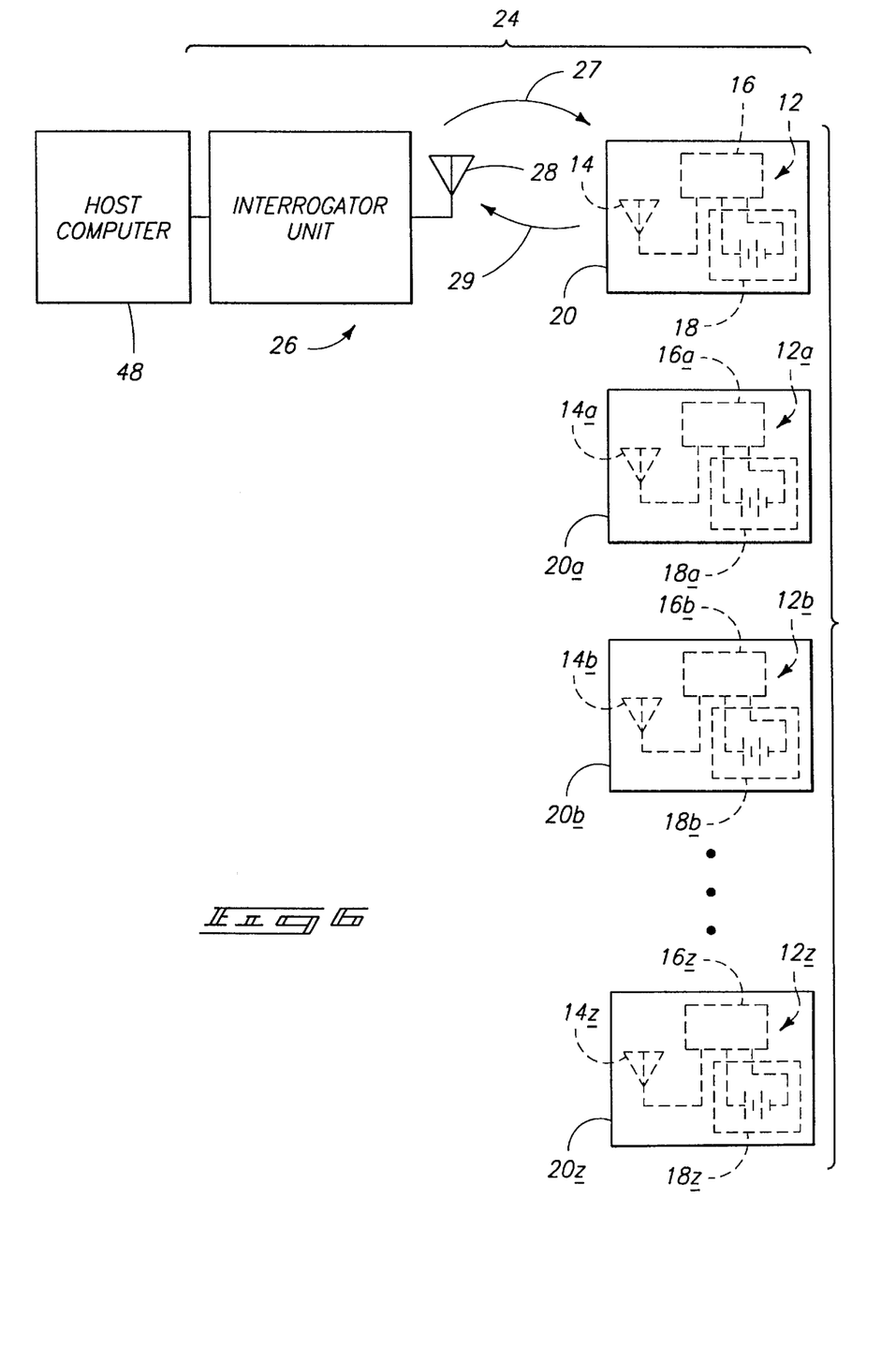
FIG. 6 is a block diagram of an electronic identification system according to the invention and includes a plurality of the FIG. 1 circuits.

In the illustrated embodiment in FIG. 4, there is no communication between devices 12. Instead, the devices 12 communicate with the interrogator 26. FIG. 4 illustrates the device 12 as being in the housing 20 of FIG. 3. The system 24 would operate in a similar manner if the device 12 is provided in a housing such as the housing 10 of FIG. 2, or any other appropriate housing. Multiple devices 12 can be used in the same field of an interrogator 26 (i.e., within communications range of an interrogator 26). Similarly, multiple interrogators 26 can be in proximity to one or more of the devices 12. An exemplary communication system which employs a plurality of RF identification devices is shown in FIG. 6. There, individual devices are designated at 12, 12a, 12b, . . . 12z (collectively "devices 12"). It will be understood that any number of devices 12 can be used in connection with system 24.

Various U.S. patent applications, which are incorporated herein by reference, disclose features that are employed in various alternative embodiments of the invention: 08/092,147, filed Jul. 15, 1993, "Wake Up Device for a Communications System" now abandoned and continuation application 08/424,827, filed Apr. 19, 1995, "Wake Up Device for a Communications System" now U.S. Pat. No. 5,750,946; 08/281,384, filed Jul. 27, 1994, "Communication System Having Transmitter Frequency Control" now U.S. Pat. No. 5,568,512; 07/990,918, filed Dec. 15, 1992, now U.S. Pat. No. 5,365,551, "Data Communication Transceiver Using Identification Protocol"; 07/899,777, filed Jun. 17, 1992, "Radio Frequency Identification Device (RFID) and Method of Manufacture, Including an Electrical Operating System and Method," now abandoned; 07/921,037, filed Jul. 24, 1992, "Anti-Theft Method for Detecting The Unauthorized Opening of Containers and Baggage," now abandoned; 07/928,899, filed Aug. 12, 1992, "Electrically Powered Postage Stamp or Mailing or Shipping Label Operative with Radio Frequency (RF) Communications," now abandoned; and 08/032,384, filed on Mar. 17, 1993, "Modulated Spread Spectrum in RF Identification Systems Method," now allowed.

The above described system 24 is advantageous over prior art devices that utilize magnetic field effect systems because, with the system 24, a greater range can be achieved, and more information can be obtained (instead of just an identification number).

As a result, such a system 24 can be used, for example, to monitor large warehouse inventories having many unique products needing individual discrimination to determine the presence of particular items within a large lot of tagged products. The system can also be used to counteract terrorism to monitor luggage entering a plane to ensure that each item of luggage that enters the plane is owned by a passenger who actually boards the plane. Such a technique assumes that a terrorist will not board a plane that he or she is planning to bomb. The system 24 is useful whenever RF transmission over a large range is desirable, such as for inventory control. In one embodiment, the sensitivity of the devices 12 is adjustable so that only devices within a certain range of the interrogator 26 will respond. In another embodiment, the power of the interrogator 26 is adjustable so that only devices within a certain range of the interrogator 26 will respond.

However, a power conservation problem is posed by such implementations where batteries are used to supply power to the integrated circuits 16. If the integrated circuit 16 operates continuously at full power, battery life will be short, and device 12 will have to be frequently replaced. If the battery 18 is permanently sealed in a housing, replacement of the battery will be difficult or impossible. For example, one reason for sealing the battery with the integrated circuit 16 and antenna 14 in a housing is to simplify the design and construction, to reduce the cost of production, and protect the electrical interconnections between devices. Another reason is protection of the battery and integrated circuit 16 from moisture and contaminants. A third reason is to enhance the cosmetic appeal of the device 12 by eliminating the need for an access port or door otherwise necessary to insert and remove the battery. When the battery is discharged, the entire badge or stamp is then discarded. It is therefore desirable in this and other applications to incorporate power conservation techniques into the integrated circuit 16 in order to extend useful life.

In one embodiment, the devices 12 switch between a "sleep" mode of operation, and higher power modes to conserve energy and extend battery life during periods of time where no interrogation signal 27 is received by the device 12. These power conservation techniques are described in greater detail below.

In one embodiment of the invention, in order to further extend the life of the battery 18, the receiver sensitivity of the device 12 is tuned over a range of tuned and detuned states in order to modify the ability of the device to detect signal 27, and therefore adjust the tendency for the device to wake up. One way to adjust the receiver sensitivity is by adjusting the sensitivity, or impedance of the antenna. Another way is by controlling the gain of amplifiers included in the receiver. Another way is to adjust or switch in different circuit elements in the device 12, thereby realizing different circuit configurations. Additionally, the transmitting sensitivity for the device 12 can be adjusted. For example, transmitting range can be adjusted by controlling interrogator continuous wave power if the transmitter is operating in backscatter mode, and by controlling output power if the transmitter is in active mode.

Overview of Integrated Circuit

FIG. 5 is a high level circuit schematic of the integrated circuit 16 utilized in the devices of FIGS. 1–4. In the embodiment shown in FIG. 5, the integrated circuit 16 is a monolithic integrated circuit. More particularly, in the illustrated embodiment, the integrated circuit 16 comprises a single die, having a size of 209×116 mils$^2$, including the receiver 30, the transmitter 32, a micro controller or microprocessor 34, a wake up timer and logic circuit 36, a clock recovery and data recovery circuit 38, and a bias voltage and current generator 42.

In one embodiment, a spread spectrum processing circuit 40 is also included in the integrated circuit 16 and formed relative to the single die. In this embodiment, signals received by the receiver 30 are modulated spread spectrum signals. Spread spectrum modulation is described below. In the illustrated embodiment, the modulation scheme for replies sent by the transmitter 32 is selectable. One of the available selections for replies sent by the transmitter 32 is modulated spread spectrum.

Spread Spectrum Modulation

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant radio frequency identification system 24. The spread spectrum modulation technique of the illustrated embodiment is advantageous because the interrogator signal can be distinguished from other signals (e.g., radar, microwave ovens, etc.) operating at the same frequency. The spread spectrum signals transmitted by the device 12 and by the interrogator 26 (FIG. 4) are pseudo random and have noise-like properties when compared with the digital command or reply. The spreading waveform is controlled by a pseudo-noise or pseudo random number (PN) sequence or code (described below). The PN code is a binary sequence that appears random but can be reproduced in a predetermined manner by the device 12. More particularly, incoming spread spectrum signals are demodulated by the device 12 through cross correlation with a version of the pseudo random carrier that is generated by the device 12 itself. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is phase modulated, and the receiver performs coherent or differentially coherent phase-shift keying (PSK) demodulation. In another embodiment, the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are also disclosed in the following patent applications and patent, which are incorporated herein by reference: U.S. patent application Ser. No. 08/092,147; U.S. patent application Ser. No. 08/424,827, filed Apr. 19, 1995; and U.S. Pat. No. 5,121,407 to Partyka et al. They are also disclosed, for example, in "Spread Spectrum Systems," by R. C. Dixon, published by John Wiley and Sons, Inc.

The system disclosed in U.S. patent application Ser. No. 08/092,147 includes two receivers, a low power receiver for detecting a wake up signal from an interrogator, and a high power receiver for receiving commands from an interrogator. On the other hand, the integrated circuit 16 of the illustrated embodiment employs a single receiver for both wake up and receiving commands from an interrogator. Another difference is that in the system 12 of the illustrated embodiment the receiver, not the interrogator, controls wake up. In the system 24 of the illustrated embodiment, the integrated circuit 16 includes a timer that causes the receiver and support circuitry to be powered on periodically. This is described in greater detail elsewhere.

Backscatter and Frequency Hopping

The interrogator sends out a command that is spread around a certain center frequency (e.g, 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the device 12 receives the command from the interrogator, the device 12 processes the command. If the device 12 is in a backscatter mode it alternately reflects or does not reflect the signal from the interrogator to send its reply. For example, in the illustrated embodiment, two halves of a dipole antenna are either shorted together or isolated from each other, as described below in greater detail. In the illustrated embodiment, frequency hopping does not occur when the interrogator transmits a command, but occurs when the interrogator is in the continuous wave mode. The interrogator, in the continuous wave mode, hops between various frequencies close to the 2.44 GHz frequency. These various frequencies are sufficiently close to the 2.44 GHz frequency that backscatter antenna reflection characteristics of the device 12 are not appreciably altered.

Because the interrogator is hopping between frequencies, the interrogator knows what frequency backscatter reflections to expect back from the device 12. By hopping between various frequencies, the amount of time the interrogator continuously uses a single frequency is reduced. This is advantageous in view of FCC regulatory requirements.

In the illustrated embodiment, no attempt is made to frequency hop at the interrogator to a pseudo-random sequence and then correlate to that at the receiver. However, in alternative embodiments, such correlation takes place.

CMOS Process

The integrated circuit 16 is formed according to semiconductor wafer processing steps, such as CMOS semiconductor wafer processing steps used to form static random access memories. In the preferred embodiment, the integrated circuit 16 is a single metal integrated circuit. In other words, the integrated circuit 16 is formed using a single metal layer processing method. More particularly, only one layer of metal (e.g., aluminum) is employed. This is advantageous in that it results in a lower cost of production.

In this processing method, a p-type wafer is employed. The processing method employed provides n-well areas used to define p-channel transistors; an active area which is used to define p+ and n+ diffused regions inside the p-type wafer or inside the n-well areas. Next, a layer is provided that helps prevent leakage between adjacent devices. Then, transistor are defined by forming n-type and p-type polysilicon. Then, a contact layer is defined for connecting desired intersections of polysilicon with metal (aluminum) that is subsequently formed. The contact layer is also used, in some instances, for connecting desired intersections of the metal that is subsequently formed with active area. Then the metal layer is formed. The contact layer provides a means for connecting metal with layers below the metal. Then, a passivation step is performed. Passivation means that the die is covered with a protective layer and holes are cut around the edge of the die so that electrical connection can be made to the bond pads.

In some processing, after the metal layer is formed, an insulating layer is provided, and another layer of aluminum is formed above the insulating layer. Holes are provided at selected locations to interconnect the top layer of aluminum with lower layers. An advantage of using multiple layers of metal is that it provides greater flexibility in how functional blocks are laid out and in how power is bused to various areas. However, multiple metal layers add processing steps. This results in added cost and complexity.

The process of the preferred embodiment employs only one layer of metal, and is therefore a relatively simple, inexpensive process.

The following U.S. patents, which are incorporated herein by reference, disclose CMOS processing techniques that are employed in various alternative embodiments of the invention: U.S. Pat. No. 5,489,546 to Ahmad et al.; U.S. Pat. No. 5,272,367 to Dennison et al.; and U.S. Pat. No. 5,134,085 to Gilgen et al.

Various other processing methods can be employed in alternative embodiments.

Transmitter and Receiver

The receiver 30 is a radio frequency receiver included in the integrated circuit 16, and the transmitter 32 is a radio frequency transmitter included in the integrated circuit 16. In one embodiment, the receiver 30 includes a Schottky diode detector. Various forms of Schottky diode detectors are described in a paper titled "Designing Detectors for RF/ID Tags," by Raymond W. Waugh of Hewlett-Packard Company, submitted for presentation at the RF Expo, San Diego, Feb. 1, 1995, and incorporated herein by reference.

The receiver 30 of the illustrated embodiment makes use of the rate or frequency of data included in incoming signals, but does not make use of the carrier frequency of the incoming signal. In other words, operation of the receiver 30 is independent of the frequency of the carrier of the incoming signal over a wide range of carrier frequencies.

Therefore, the device 12 can operate over a wide range of carrier frequencies. For example, the device 12 can operate with carriers of 915–5800 MHZ. In a more particular embodiment, the device 12 can operate with carrier frequencies in the 915, 2450, or 5800 MHZ bands. In the illustrated embodiment, the antennas are half wave antennas, and frequency selectivity of the device 12 is achieved based on selection of the antenna external to the integrated circuit 16. Capacitors employed in the Schottky diode detector are also selected based on the carrier frequency that will be employed.

In one embodiment, the transmitter 32 is switchable between operating in a modulated backscatter transmitter mode, and operating in an active mode. The transmitter 32 switches between the backscatter mode and the active mode in response to a radio frequency command, instructing the transmitter to switch, sent by the interrogator 26 and received by the receiver 30. In the active mode, a carrier for the transmitter is extracted from a signal received by the receiver 30.

Active transmitters are known in the art. See, for example, U.S. patent application Ser. No. 08/281,384. U.S. patent application Ser. No. 08/281,384 also discloses how transmit frequency for the transmitter 32 is recovered from a message received via radio frequency from the interrogator 26. The device 12 differs from the device disclosed in U.S. patent application Ser. No. 08/281,384 in that a VCO control voltage is stored as an analog voltage level on a capacitor instead of as a digital number in a register. Further, in the illustrated embodiment, the recovered frequency is also used by the integrated circuit 16 to generate a DPSK subcarrier for modulated backscatter transmission.

The transmitter is capable of transmitting using different modulation schemes, and the modulation scheme is selectable by the interrogator. More particularly, if it is desired to change the modulation scheme, the interrogator sends an appropriate command via radio frequency. The transmitter can switch between multiple available modulation schemes such as Binary Phase Shift Keying (BPSK), Direct Sequence Spread Spectrum, On-Off Keying (00K), and Modulated Backscatter (MBS).

Wake Up Timer and Logic Circuit

The integrated circuit 16 includes the wake up timer and logic circuit 36 for conserving battery power. More particularly, the integrated circuit 16 normally operates in a sleep mode wherein most circuitry is inactive and there is a very low current draw on the battery 18. One circuit that is active during the sleep mode is a timer for waking up the integrated circuit at predetermined intervals. In the illustrated embodiment, the interval is 16 milliseconds; however, various other intervals can be selected by radio frequency by sending a message from the interrogator 26 to the device 12. For example, in the illustrated embodiment, the interval is selectable as being 0.5, 16, 64 or 256 milliseconds.

Assuming the selected interval is 16 milliseconds, after every sleep period of 16 milliseconds the wake up timer and logic circuit 36 activates the receiver 30, the clock recovery and data recovery circuit 38, and all the bias currents and voltages associated with the receiver 30. Such bias currents and voltages are generated by the bias voltage and current generator 42. The receiver 30 then determines if there is a radio frequency signal present.

If there is no radio frequency signal present, the wake up timer and logic circuit 36 deactivates the receiver 30 and clock recovery and data recovery circuit 38. The receiver then goes back to sleep in the low current mode until another 16 milliseconds pass (or whatever sleep period is selected).

If there is a radio frequency signal present, the receiver will unspread the spread spectrum signal for processing. It is possible that while the receiver is on, it may detect a radio frequency signal from a source other than the interrogator 26. For example, other radio frequency transmitting devices may be operating in the area. In the illustrated embodiment, the receipt is set to receive microwave frequency signals, so that a small antenna can be used. Therefore, the wake up timer and logic circuit 36 performs tests to determine if a radio frequency signal received on wake up is valid. If the wake up timer and logic circuit 36 determines that the incoming signal is not valid, the integrated circuit 16 returns to the sleep mode. The illustrated integrated circuit 16 consumes approximately one micro amp in the sleep mode, and the battery 18 is expected to last up to 10 years with a current drain of that order, depending on how often radio frequency signals are present and on the capacity of the battery.

If a radio frequency signal is detected upon wake up, the wake up timer and logic compares the incoming signal to known characteristics of expected spread spectrum encoded data. In the illustrated embodiment, a valid incoming radio frequency signal will be a spread spectrum signal having a thirty-one chip code representing a single data bit. To represent a digital one ("1") the thirty-one chip code is sent as is. To represent a digital zero ("0") the thirty-one chip code is inverted. The wake up timer and logic circuit 36 knows how many transitions there are in a valid thirty-one chip sequence, and knows the time period within which all those transitions are expected (or the frequency of the transitions). After the incoming radio frequency signal is amplified and converted to baseband, it is tested against known characteristics of a valid signal.

If the incoming signal does not pass these tests, the integrated circuit 16 returns to the sleep mode. If the incoming signal does pass these tests, then the wake up timer and logic circuit determines whether the clock recovery and data recovery circuit 38 locks on to the clock frequency contained in the chip rate of the incoming signal within a predetermined time period. If frequency lock is obtained, the microprocessor is turned on for processing of the received command.

If frequency lock is not obtained within the predetermined time, the integrated circuit 16 returns to the sleep mode.

Other appropriate tests can be performed in embodiments where spread spectrum is not employed. In these embodiments, knowing how valid data is encoded, the wake up timer and logic still compares the number of transitions received in a given amount of time with an expected number of transitions for a valid signal.

In summary, various tests are performed, and the order in which they are performed is preferably selected to most quickly identify invalid signals. U.S. patent application Ser. No. 08/424,827, filed Apr. 19, 1995 and U.S. patent application Ser. No. 081092,147, which are incorporated herein by reference, disclose tests that could be employed in various alternative embodiments of the invention.

After the wake up timer and logic circuit 36 determines that a received signal is valid, the integrated circuit 16 then performs clock recovery. To save space and cost, the preferred device 12 does not include a crystal timing element (clock). Instead, all timing for the device 12 is extracted from valid incoming signals received by the receiver 30.

In one embodiment, a valid incoming radio frequency signal is digital, and starts with a preamble, which is followed by a start code (or Barker code), which is followed by data (e.g., a command). For example, in the illustrated embodiment, the preamble is a long (e.g., eighteen milliseconds) string of zeros; i.e., the thirtyne chip sequence is inverted, and sent repeatedly for approximately 18 milliseconds. In the illustrated embodiment the data or command after the Barker code is shorter than the preamble, and is approximately 4 milliseconds long.

Clock Recovery and Data Recovery Circuit

The clock for the entire integrated circuit 16 is extracted from the incoming message itself. In one embodiment, the transmitter 32 is selectable as being operable in an active transmission mode, or a backscatter mode. If the transmitter 32 is operating in an active mode, is the extracted clock is multiplied up to the carrier frequency of the transmitter 32. For example, in one embodiment, the transmitter carrier frequency is 2.44 GHz The choice of chip rate is a function of the carrier frequency and the carrier frequency has to be divisible by a power of two to give the chip rate on the input.

If the transmitter 32 is operating in a backscatter mode, the clock that has been recovered from the incoming signal received by the receiver 30 is divided to make it slower and is then used for frequency shift key or phase shift key modulated backscatter.

In summary, a clock is recovered from the incoming message, and used for timing for the micro controller 34 and all the other clock circuitry on the chip, and also for deriving the transmitter carrier or the subcarrier, depending on whether the transmitter is operating in active mode or backscatter mode.

Note that there are disadvantages to generating a transmit frequency in this fashion. In an alternative embodiment (not shown), a crystal is employed to generate a clock. A crystal provides a more stable, reliable clock to generate the transmit frequency, but also increases cost and size of the device 12.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes the chips from the spread spectrum signal, and reduces each thirty-one chip section down to a bit of one or zero, which is passed to the micro controller 34.

Micro Controller

The micro controller 34 includes a serial processor, or I/O facility that received the bits from the spread spectrum processing circuit 40. The micro controller 34 performs further error correction. More particularly, a modified hamming code is employed, where each eight bits of data is accompanied by five check bits used by the micro controller 34 for error correction. The micro controller 34 further includes a memory, and after performing the data correction, the micro controller 34 stores bytes of the data bits in memory. These bytes contain a command sent by the interrogator 26. The micro controller 34 responds to the command.

For example, the interrogator 26 may send a command requesting that any device 12 in the field respond with the device's identification number. Status information is also returned to the interrogator 26 from the device 12 when the device 12 responds.

Unalterable Identification

In one embodiment, the integrated circuit 16 includes unalterable indicia (a signature), different from the device's identification number discussed above. The unalterable indicia is burned into programmable read only memory or formed using a laser operating on fusible links. The unalterable indicia is indicative of the history of the particular die used to manufacture the integrated circuit 16. For example, in the illustrated embodiment, the unalterable indicia includes a lot number, wafer number, and die number of the die used to manufacture the integrated circuit 16. This information is transmitted by the transmitter in response to a manufacturer's command received by the receiver. In one embodiment, the manufacturer's command is a controlled access, or secret command that is not readily ascertainable by the public or purchaser/user of the device. This unalterable indicia can be used to trace manufacturing problems in defective devices 12, or to locate stolen products carrying a device 12.

Communication Protocol

In one embodiment, communications from the interrogator 26 to the device 12, and communications from the device 12 to the interrogator 26 use different physical protocols.

The physical communications protocol for communications from the interrogator 26 to the device 12 is referred to as the "forward link" protocol. The forward link data is sent in the following order:

Preamble

Barker Code

Command Packet

Check Sum

A Maximal Length Pseudo Noise (PN) Sequence is used in the Direct Sequence Spread Spectrum (DSSS) communications scheme in the forward link. In one embodiment, the sequence is generated by a linear feedback shift register of the form [5,2]. That is, there are five registers, the output of the second register is X-ORed with the output of the fifth register, and the result is fed into the input of the first register one. This produces a repeating 31 "chip" sequence. The sequence ends with all registers set to one. The sequence is taken from the output of the first register. This code is synchronous with the data in that each data bit comprises one and only one full PN sequence. The chip sequence for each bit is:

001 1010 0100 0010 1011 1011 0001 1111.

Other embodiments are, of course, possible. For example, other forms of linear feedback shift registers can be employed.

A zero bit is transmitted as one inverted full cycle of the PN sequence. A one bit is transmitted as one full non-inverted cycle of the PN sequence.

In the illustrated embodiment, the data is not differentially encoded.

In one embodiment, there are at least two available "chipping" rates. One rate is 9.5375 Mchips/sec (high band) and another rate is 4.768750 Mchips/sec (low band).

The preamble precedes the data. In one embodiment, the preamble includes a series of zeros, followed by a start or Barker code. In embodiments where the device 12 includes wake up timer and logic circuitry 36, the preamble includes a series of zeros for a duration equal to the wakeup interval (e.g., 0.5, 16, 64, or 256 ms) plus 2 milliseconds, followed by a start or Barker code.

In one embodiment, the Barker code is defined by the following bit string: 1111 1001 1010 1. Other embodiments are possible.

Command data is grouped into 13-bit words. Each word includes eight data bits (D7, D6, D5, D4, D3, D2, D1, D0) and five ECC (Error Correction Code) bits (P4, P3, P2, P1, and P0). In one embodiment, the bit transmission order is (with D7 transmitted first): D7, D6, D5, D4, D3, D2, D1, D0, P4, P3, P2, P1, P0 . . .

In one embodiment, the ECC bits (P4–P0) are generated using the following equations:

P0=(D1+D2+D5+D7) modulo 2

P1=[(D1+D3+D4+D6) modulo 2] Complement

P2=(D0+D2+D3+D6+D7) modulo 2

P3=[(D0+D4+D5+D6+D7) modulo 2] Complement

P4=(D0+D1+D2+D3+D4+D5) modulo 2.

Data rates depend on which data band is being used. The high data band has an effective data rate (adjusting for PN and ECC) of 189.3 Kbps. The low data band has an effective data rate of 94.68 Kbps.

In the illustrated embodiment, a 16-bit check sum is provided to detect bit errors on the packet level. A device 12 can be programmed to either return a reply if a bad check sum is found in the forward link, or to simply halt execution and send no replies. In one embodiment, a 16 bit CRC is employed in the forward link, the return link, or both, instead of or in addition to the check sum.

The physical communications protocol for communications from the device 12 to the interrogator 26 is referred to as the "return link" protocol. In the illustrated embodiment, the return link messages are sent in the following order:

Preamble,

Barker Code,

Reply Packet

Check Sum

After sending a command, the interrogator sends a continuous unmodulated RF signal with a frequency of 2.44175 Ghz. Return link data is Differential Phase Shift Key (DPSK) modulated onto a square wave subcarrier with a frequency of 596.1 Khz. A data 0 corresponds to one phase and data 1 corresponds to another, shifted 180 degrees from the first phase. The subcarrier is used to modulate antenna impedance of a device 12. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. The switch driving a printed half wavelength dipole antenna gives a typical range of 15 feet when the interrogator 26 transmits at 30 dBm into a 6 dB gain antenna.

The preamble for the return link includes 2000 bits, alternating 2 zeros then 2 ones, etc., and a 13-bit start (Barker) code. Alternative preambles are possible.

In the illustrated embodiment, the start code or Barker Code is defined by the following bit string: 1111 1001 1010 1.

The reply link data is grouped in 13 bit words. Each word is composed of 8 data bits (D7, D6, D5, D4, D3, D2, D1, D0) and 5 ECC bits (P4, P3, P2, P1, P0).

The Block Encoded Sequence is D7, D6, D5, D4, D3, D2, D1, D0, P4, P3, P2, P1, P0.

The Block ECC Bits (P4–P0) are generated using the following equations:

$$P0=(D1+D2+D5+D7) \text{ modulo } 2$$

$$P1=[(D1+D3+D4+D6) \text{ modulo } 2] \text{ Complement}$$

$$P2=(D0+D2+D3+D6+D7) \text{ modulo } 2$$

$$P3=[(D0+D4+D5+D6+D7) \text{ modulo } 2] \text{ Complement}$$

$$P4=(D0+D1+D2+D3+D4+D5) \text{ modulo } 2.$$

In the illustrated embodiment, the bit duration is 6.71 $\mu$s making the effective data rate 91.75 Kbps for the return link.

In the illustrated embodiment, a 16-bit check sum is provided to detect bit errors on the packet level. In one embodiment, a 16 bit CRC is employed in addition to or instead of the check sum.

Each pair of data words is interleaved, starting with the Barker code and the first data word. transmitted bit order for two sequential words, A and B, is D7A, D7B, D6A, D6B, D5A, D5B, D4A, D4B, D3A, D3B, D2A, D2B, D1A, D1B, D0A, D0B, P4A, P4B, P3A, P3B, P2A, P2B, P1A, P1B, P0A, P0B.

D7A is the first transmitted bit. In the illustrated embodiment, DPSK is applied to the interleaved data.

Arbitration

If the interrogator 26 sends out a command requesting that all devices 12 within range identify themselves, and gets a large number of simultaneous replies, the interrogator 26 may not able to interpret any of these replies. Further, there may be multiple interrogators in an area trying to interrogate the same device 12.

Therefore, arbitration schemes are provided. With the more common scenario of multiple devices 12 trying to respond to an interrogator, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent uninterrupted communication with devices 12, one at a time, by addressing only one device 12.

If the interrogator 26 has prior knowledge of the identification number of a device 12 which the interrogator 26 is looking for, it can specify that a response is requested only from the device 12 with that identification number. Arbitration schemes are discussed below in greater detail.

U.S. Pat. No. 5,365,551 to Snodgrass et al., which is incorporated by reference, discloses arbitration schemes that could be employed in various alternative embodiments of the invention.

Details of Arbitration

The arbitration of multiple interrogators per device 12 is a detection method based upon each interrogator using a unique interrogator ID (InterrId). The InterrId is sent to a device 12 in a command. The device 12 also stores an interrogator ID TagStoredInterrId. The TagStoredInterrId is only updated by a WriteTagRegsXXX command. A RcvdInterrId is included in replies from a device 12. If a TagStoredInterrId does not match the RcvdInterrId then the tag will not respond with a reply.

The arbitration of more than one tag per interrogator 26 is accomplished by using an ArbitrationValue and an ArbitrationMask during an Identify command. Contained within each device 12 is a random value ID (RandomValueId) and an arbitration lockout (IDENTIFY_LOCKOUT) bit. The RandomValueId is set to a "random" binary number upon command by an interrogator. It may also be set by an Identify command setting a SELECT_RANDOM_VALUE bit in SubCmnd.

The following examples use a 1-byte ArbitrationValue for simplicity. If an interrogator 26 transmits an Identify command with its ArbitrationMask set to 0000 0000 (binary), all devices 12 in the receiving range will respond. If there is only one device 12, communications may proceed between the interrogator 26 and device 12. If there are multiple devices 12 responding, the interrogator 26 will detect a collision and will start the arbitration sequence. To start the arbitration sequence among multiple tags, the interrogator 26 instructs a the tags to clear their IDENTIFY_LOCKOUT bit and (possibly) re-randomize their RandomValueId values. The ArbitrationValue 0000 0000 and ArbitrationMask 0000 0001 are then transmitted to all devices 12 in range. The devices 12 perform a logical ANDing (masking) of the ArbitrationMask and the RandomValueId. If the result matches the ArbitrationValue sent by the interrogator 26, the device or devices 12 will reply to the Identify command. If not, the interrogator 26 will increment the ArbitrationValue to 0000 0001 and try again.

The interrogator 26 then checks each of the possible binary numbers (0000 0000 and 0000 0001 in this case) in the expanded mask (0000 0001) for a response by a device 12. If a single device 12 responds to one of these values, the interrogator 26 will reply by commanding it to set its lockout bit. If any collisions are detected at this mask level, the mask would be widened again by one bit, and so on through the eight bit wide mask (256 numbers). If no collisions are detected for a particular ArbitrationValue and ArbitrationMask combination, the TagId returned in the reply is used for direct communication with that particular device 12. During the arbitration sequence with up to about one hundred devices 12, the mask will eventually grow large enough such that all devices 12 can respond without collision. After the mask widens to four or five bits, more devices 12 have unique random numbers and single tag replies are received. Thus with each expansion of the ArbitrationMask, there are fewer and fewer tags left to Identify.

With a large number of tags in range, it is possible that several devices 12 will choose the same value for their RandomValueId. In this case, the complete mask will be used. Collisions will still occur and the remaining tags will be instructed to select a new Random ValueId. If an application dictates, for example, that one hundred tags will usually be present in range of the interrogator 26, it would be advantageous to start with the mask set to eight bit wide (11111111) and count up through 256 instead of starting with the mask set at 0000 0000, followed by 0000 0001, 0000 0011, etc. Other arbitration schemes can be implemented by the user.

Reply

After the micro controller processes a command from the interrogator 26, the micro controller includes response circuitry which formats the reply as specified in the protocol and the formatted reply leaves the micro controller via a serial data port of the micro controller. According to one aspect of the invention, the microcontroller also includes delay circuitry which is configured to delay transmission of an individual reply. In a preferred implementation, the delay circuitry comprises a random value generator which is effective to produce a delayed transmission from a respective one of devices 12, 12a–12z. Each individual device 12, 12a–12z preferably includes its own random value generator. In a preferred aspect, each responding device, in a multiple-response scenario, generates a random value whereupon logic circuitry on board each device masks a portion of the random value and uses the resulting product to calculate a delay. Preferably, at least two delays from responding devices 12, 12a–12z are sufficiently different so as to decorrelate the response message in a manner which permits the interrogator 26 to detect an error. The delay aspect of the reply is discussed below in more detail in the "Time Delay Reply" section.

If desired, the formatted reply is spread spectrum encoded by the spread spectrum processing circuit 40. The reply is then modulated by the transmitter 32. The transmitter 32 is capable of transmitting using different modulation schemes, and the modulation scheme is selectable by the interrogator 26. More particularly, if it is desired to change the modulation scheme, the interrogator 26 sends an appropriate command via radio frequency.

The transmitted replies have a format similar to the format of incoming messages. More particularly, a reply starts with a preamble, followed by a Barker or start code which is thirteen bits long, followed by actual data.

No stop bits are included in the incoming message or reply, in the preferred embodiment. Instead, part of the incoming message describes how many bytes are included, so the integrated circuit 16 knows how much information is included. Similarly, part of the outgoing reply describes how many bytes are included, so the interrogator 12 knows how much information is included. The incoming message and outgoing reply preferably also include a check sum or redundancy code so that the integrated circuit 16 or the interrogator 12 can confirm receipt of the entire message or reply.

After the reply is sent, the integrated circuit 16 returns to the sleep mode, and the wake up timer and logic circuit 36 starts timing again for the next wake up (e.g., in 16 milliseconds, or whatever period is selected).

Time Delay Reply

In accordance with one inventive aspect of the invention, arbitration is provided in a wireless communication system. Preferably, such system is an RF communication system and such arbitration is provided between a plurality of wireless RF identification devices 12, 12a–12z (FIG. 6). Such is the case when, for example, more than one device attempts to reply to one or more interrogator(s).

Figure 7:
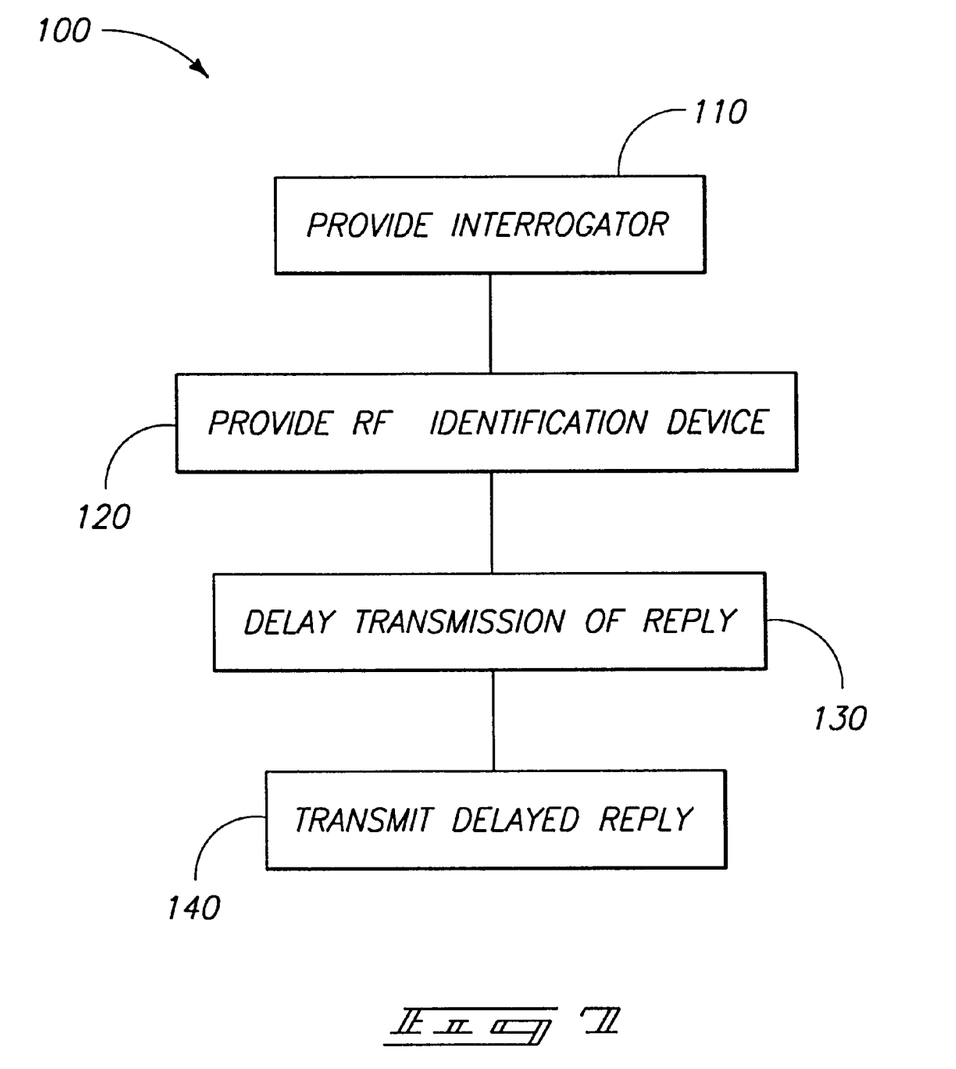
FIG. 7 is a flow diagram depicting a methodology in accordance with the invention.

Preferred methodical steps of this aspect of the invention are set forth in a high level flow chart appearing in FIG. 7 generally at 100. At step 110, at least one interrogator 26 (FIG. 6) is provided. Preferably, interrogator 26 is configured for transmitting and receiving RF communication data as described in application Ser. No. 08/705,043, incorporated by reference above. More than one interrogator can be provided. At step 120, at least one, and preferably a plurality of RF identification devices, such as devices 12, 12a–12z (FIG. 6) are provided. In a preferred implementation, such devices include integrated circuitry which is configured for receiving RF communication data transmitted by interrogator 26. Responsive to receiving the RF communication data from interrogator 26, the communication devices preferably perform an operation directed to determining which devices need to reply to the interrogator. One such operation is described above in connection with the Identify command and constitutes the devices 12 performing a logical ANDing (masking) of the ArbitrationMask transmitted by the interrogator 26 and the Random ValueId stored by the device. Accordingly, if the result matches the masked ArbitrationValue sent by the interrogator 26, the device or devices 12 will transmit a reply back to the interrogator.

According to one aspect of the invention, each reply by an individual device 12 is delayed, at step 130, for a determinable amount of time. Preferably, at least some of the determinable amounts of time are different. Accordingly, at least some of the resulting delays are different. Such enables the interrogator to detect a collision between multiple responses or replies from a plurality of devices. In a preferred implementation, individual devices 12 include delay circuitry which calculates their own individual delays. Preferably, such calculated delays are used to define amounts of time which are different as between those responding or transmitting devices 12. According to one aspect of the invention, a random value is generated and incorporated into the determinable amount of time which is utilized to delay a reply for a particular respective transmitting device 12. According to another aspect, the random value is used to calculate the determinable amount of time.

In a preferred aspect of the invention, each device 12 includes a random value generator supplied by hardware contained by each device 12. The random value generator can be contained in integrated circuit 16 or separately provided. Each random value generator returns an 8-bit random value. Accordingly, such gives $2^8$ different numbers which could be used for the delay. Such random value is then masked such that the upper-most significant bits are dropped. Preferably, the three least significant bit are left. This ensures that the calculated delay will be 0–7 times a predetermined delay value. Next, a numerical 1 is added to the masked random value to give a masked random value sum and to address wrap around concerns. The masked random value sum is then multiplied by the predetermined delay value. In one implementation, the predetermined delay value is given by BitTime/8, where "BitTime" is defined as the time required to send one bit from the device 12 to the interrogator 24. Other predetermined delay values are possible such as various multiples of "BitTime". With the delay having been calculated, a transmitted reply can be sent at step 140. Such delay implementation does not cause appreciable system delay because the round trip message time takes approximately 40 ms and the delay is only between 1.25 µs to 10.0 µs. Additionally, the above calculations can be adjusted to accommodate various BitTimes, if so needed.

Alternately considered, the invention provides for individual identification device replies to be corrupted in a manner which permits the interrogator to detect a collision in the event of multiple device replies and to take appropriate action in response thereto. In one implementation, such corruption constitutes incorporating a transmission delay in a reply which is different from a transmission delay which is incorporated for at least one other responding or transmitting device 12.

In one application, the above-described methodology enables the interrogator to more precisely and accurately detect a collision between multiple replies. Such is accomplished, in the preferred embodiment, by incorporating the delay into the beginning of a reply message from an individual device 12. Initially, after the delay is calculated and in accordance with "return link" protocol, a message including a preamble, a Barker code, a reply packet, and a check sum are sent to the interrogator. Once received and suitably processed by the interrogator, the interrogator compares the check sum which was returned with the check sum which was originally sent. If the check sums match, then there was no collision and further interrogator processing continues. If the check sums do not match, then a collision has occurred and post-collision processing can now take place in accordance with the application program. An exemplary post-collision processing may change the Arbitration-Mask and/or ArbitrationValue and re-execute the Identify command.

Applications

There are a large number of possible applications for devices such as the device 12. Because the device 12 includes an active transponder, instead of a transponder which relies on magnetic coupling for power, the device 12 has a much greater range.

One application for devices 12 is inventory control to determine the presence of particular items within a large lot of products.

Another application for devices 12 is electronic article surveillance (EAS). The devices 12 can be attached to retail items in a store having an interrogator 26 at the exits, for detection of unauthorized removal of retail items. The merchant can deactivate or remove devices 12 from retail items for which proper payment has been made.

Another application for devices 12 is to track migration of animals.

Another application for devices 12 is to counteract terrorism by monitoring luggage entering a plane to ensure that each item of luggage that enters the plane is owned by a passenger who actually boards the plane. The devices 12 can also be used to monitor luggage to locate lost luggage.

The device 12 can be use to track packages, such as courier packages.

The device 12 can be used to track hazardous chemicals or waste to ensure that it safely reaches a proper disposal site.

The device 12 can be used for security purposes, to track personnel within a building. The device 12 can also be used for access control.

The device 12 can be used to monitor and manage freight transit. For example, interrogators 26 can be placed at the entrance and exit of a terminal (e.g., a rail or truck terminal), to monitor incoming and outgoing shipments of vehicles bearing the devices 12.

The device 12 can be used to impede car theft. A European anti-theft directive (74/61/EEC) provides that all new car models sold after January 1997 must be fitted with electronic immobilizers and approved alarm systems. The devices 12 can be provided on keychains or within car keys, and interrogators 26 placed in cars, so that the vehicle will be inoperable unless the specified device 12 for a specific car is used. The interrogator 26 can control the door locks of a car, or the ignition of the car, or both. Because the device 12 includes memory, the interrogator 26 in the car can periodically automatically change values in the device 12 (like changing a password).

Devices 12 can be placed in cars and used in connection with electronic toll collections systems. Because the devices 12 can be used to identify the respective cars in which they are placed, interrogators 26 in toll plazas can charge appropriate accounts based on which cars have passed the toll plaza.

Devices 12 can be placed in cars and used in connection with parking systems. Because the devices 12 can be used to identify the respective cars in which they are placed, interrogators 26 in parking areas can determine when a vehicle arrives and leaves a parking area.

The devices 12 can be used for inventory control of rental equipment.

The devices 12 can be used where bar code labels will not properly work because of harsh environmental conditions (e.g., grease, dirt, paint).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communications method comprising:
    sending a RF transmission from an interrogator configured for transmitting and receiving RF communication data;
    receiving the transmission at a plurality of RF identification devices respectively having integrated circuitry including a receiver configured for receiving RF transmissions by the interrogator and a transmitter configured to transmit a reply back to the interrogator; and
    prior to the transmitting of the reply, respective RF identification devices delaying transmission of their respective replies to the interrogator for an amount of time which is less than the amount of time required to transmit the reply, said delaying being initiated by the RF identification device responsive to RF communication data received from the interrogator, the amount of delay being different for different of the RF identification devices, wherein if there is a collision between replies from two RF identification devices, the collision can be more readily detected by the interrogator, using a checksum analysis, than if there was no delay.

2. The method of claim 1 wherein the delaying comprises delaying for a determinable amount of time which is less than the amount of time required to transmit the reply.

3. The method of claim 1 wherein the RF identification devices include respective random number generators, and wherein the delaying comprises the respective RF identification devices generating respective random delays to delay individual device replies using the respective random number generators.

4. The method of claim 1 wherein the RF identification devices include respective random number generators, and wherein the delaying comprises the respective RF identification devices generating respective random delays to delay individual device replies using the respective random number generators by generating binary random numbers and masking a plurality of bits.

5. The method of claim 1 wherein the delaying comprises generating a binary random value, masking at least the most significant bit, and incorporating the random value into the determinable amount of time.

6. The method of claim 1 wherein the delaying comprises generating a binary random value, masking a plurality of most significant bits such that three least significant bits are left unmasked, and using the three least significant bits of the random value to calculate the determinable amount of time.

7. The method of claim 1 wherein the delaying comprises generating a random value for at least some of the plurality of RF identification devices and using the random value to calculate individual respective determinable amounts of time in a range of from 0 to 7 times a predetermined amount of time.

8. The method of claim 1 wherein the reply comprises a reply packet containing a plurality of bits, and further comprising a checksum bit, the check sum being readable by the interrogator for the checksum analysis.

9. A wireless communications method comprising:
   sending an RF transmission from an interrogator configured for transmitting and receiving RF communication data;
   receiving the transmission at a plurality of RF identification devices respectively having integrated circuitry including a receiver configured for receiving RF transmissions by the interrogator and a transmitter configured to transmit a backscatter reply back to the interrogator while the transmitter transmits a carrier; and
   prior to the transmitting of the reply, respective RF identification devices delaying transmission of their respective replies to the interrogator by an amount of time that is less than a length of the reply, the amount of time being determined using respective random number generators, said delaying being initiated by the RF identification device responsive to RF communication data received from the interrogator, wherein if there is a collision between replies from two RF identification devices, the collision can be more readily detected by the interrogator, using a checksum analysis, than if there was no delay; and
   determining, with the interrogator, using a checksum analysis, whether a valid reply was received.

10. The method of claim 9 wherein the delaying comprises the RF identification devices respectively generating binary random numbers having multiple bits, masking a plurality of those bits, and using the resulting value to generate the determinable amount of time.

11. A The method of claim 10 wherein the masking comprises masking at least the most significant bit.

12. The method of claim 10 wherein the masking comprises masking a plurality of most significant bits such that three least significant bits are left unmasked, and using the three least significant bits of the random value to generate the determinable amount of time.

13. The method of claim 9 wherein the delaying comprises using the respective random number generators to generate respective determinable amounts of time in a range of from 0 to 7 times a predetermined amount of time.

14. The method of claim 9 wherein the reply comprises a reply packet containing a plurality of bits, and further comprises a checksum bit, the check sum being readable by the interrogator for the checksum analysis.

15. A wireless communications method comprising:
   providing an interrogator configured for transmitting and receiving wireless communication data;
   providing a plurality of wireless identification devices respectively including integrated circuitry configured for receiving wireless communication data transmitted by the one interrogator and responsive to said receiving generating and transmitting a reply back to the interrogator; and
   prior to the transmitting of the reply, respective wireless identification devices delaying transmission of their respective replies to the interrogator for an amount of time less than a length of the reply, said delaying being initiated by the wireless identification device responsive to wireless communication data received from the interrogator, wherein, if there is a collision between replies from two wireless identification devices, the reply will be corrupted; and
   determining, with the interrogator, using a checksum analysis, whether a valid reply was received.

16. The method of claim 15 wherein the respective identification devices include respective random number generators, and wherein the delaying comprises the respective identification devices generating respective random delays to delay individual device replies using the respective random number generators.

17. The method of claim 15 wherein the identification devices include respective random number generators, and wherein the delaying comprises the respective identification devices generating respective random delays to delay individual device replies using the respective random number generators by generating binary random numbers and masking a plurality of bits.

18. The method of claim 15 wherein the delaying comprises generating a binary random value, masking at least the most significant bit, and incorporating the random value into the determinable amount of time.

19. The method of claim 15 wherein the delaying comprises generating a binary random value, masking a plurality of most significant bits such that three least significant bits are left unmasked, and using the three least significant bits of the random value to calculate the determinable amount of time.

20. The method of claim 15 wherein the delaying comprises generating a random value for at least some of the plurality of identification devices and using the random value to calculate individual respective determinable amounts of time in a range of from 0 to 7 times a predetermined amount of time.

21. The method of claim 15 wherein the reply comprises a reply packet containing a plurality of bits, and further comprising a checksum bit, the check sum being readable by the interrogator for the checksum analysis.

22. A wireless communications system comprising:
   an interrogator configured for transmitting and receiving RF communication data, the interrogator including circuitry configured to perform a checksum analysis on received RF communication data; and
   a plurality of RF identification devices respectively including integrated circuitry configured to receive RF communication data transmitted by the interrogator and to transmit a reply back to the interrogator in response to receiving RF communication data from the interrogator, the respective RF respective RF identification devices including circuitry configured to delay transmission of their respective replies to the interrogator for an amount of time that is less than a length of the reply and in response to RF communication data received from the interrogator, the circuitry including respective random number generators, wherein if there is a collision between replies from two RF identification devices, the collision can be more readily detected by the interrogator, using a checksum analysis, than if there was no delay.

23. The system of claim 22 wherein the respective random number generators generate binary random numbers, and wherein the delay circuitry of the respective RF identification devices includes circuitry configured to mask a plurality of bits of the binary random numbers.

24. The system of claim 22 wherein the respective random number generators generate binary random numbers, and wherein the delay circuitry of the respective RF identification devices includes circuitry configured to mask the most significant bits of the binary random numbers.

25. The system of claim 22 wherein the respective random number generators generate binary random numbers, and wherein the delay circuitry of the respective RF identification devices includes circuitry configured to mask the most significant bits of the binary random numbers such that three least significant bits are left unmasked, and using the three least significant bits of the random value to define the random delay.

26. A wireless communications method comprising:
providing an interrogator configured for transmitting and receiving RF communication data;
providing a plurality of RF identification devices respectively including integrated circuitry configured for receiving RF communication data transmitted by the interrogator and responsive to said receiving generating for transmitting a reply back to the interrogator; and
prior to the transmitting of the reply, respective RF identification devices delaying transmission of their respective replies to the interrogator for an amount of time which is not so long as to purposely prevent a collision between replies, said delaying being initiated by the RF identification device responsive to RF communication data received from the interrogator, the amount of delay being different for different of the RF identification devices, wherein the RF identification devices include respective random number generators, and wherein the delaying comprises the respective RF identification devices generating respective random delays to delay individual device replies using the respective random number generators by generating binary random numbers and masking a plurality of bits and using the random numbers to calculate individual respective determinable amounts of time in a range of from 0 to 7 times a predetermined amount of time and being less than or equal to ten microseconds.

27. A wireless communications apparatus comprising:
an interrogator configured for transmitting and receiving RF communication data;
a plurality of RF identification devices respectively including integrated circuitry configured for receiving RF communication data transmitted by the interrogator and responsive to said receiving generating for transmitting a reply back to the interrogator, the respective RF identification devices delaying transmission of their respective replies to the interrogator for an amount of time which is not so long as to purposely prevent a collision between replies, said delaying being initiated by the RF identification device responsive to RF communication data received from the interrogator, the amount of delay being different for different of the RF identification devices, the RF identification devices including respective random number generators, the delaying comprising the respective RF identification devices generating respective random delays to delay individual device replies using the respective random number generators by generating binary random numbers and masking a plurality of bits and using the random numbers to calculate individual respective determinable amounts of time in a range of from 0 to 7 times a predetermined amount of time and being less than or equal to ten microseconds.

* * * * *

UNITED STATES PATENT AND TRADEMARK OFFICE
CERTIFICATE OF CORRECTION

PATENT NO. : 6,265,963 B1
DATED : July 24, 2001
INVENTOR(S) : Clifton W. Wood, Jr.

It is certified that error appears in the above-identified patent and that said Letters Patent is hereby corrected as shown below:

Column 11,
Line 67, replace "081092,147," with -- 08/092,147 --.

Column 12,
Line 14, replace "thirtyne" with -- thirty-one --.
Line 26, replace "mode, is the" with -- mode, the --.
Line 29, replace "GHz The" with -- GHz. The --.

Column 16,
Line 28, replace "instructs a the" with -- instructs the --.

Column 18,
Line 24, replace "defme" with -- define --.

Signed and Sealed this

Twenty-ninth Day of January, 2002

Attest:

*Attesting Officer*

JAMES E. ROGAN
*Director of the United States Patent and Trademark Office*